(No Model.)
J. S. GOURLAY.
COMBINED CARRIAGE AND SLEIGH.
No. 432,268. Patented July 15, 1890.
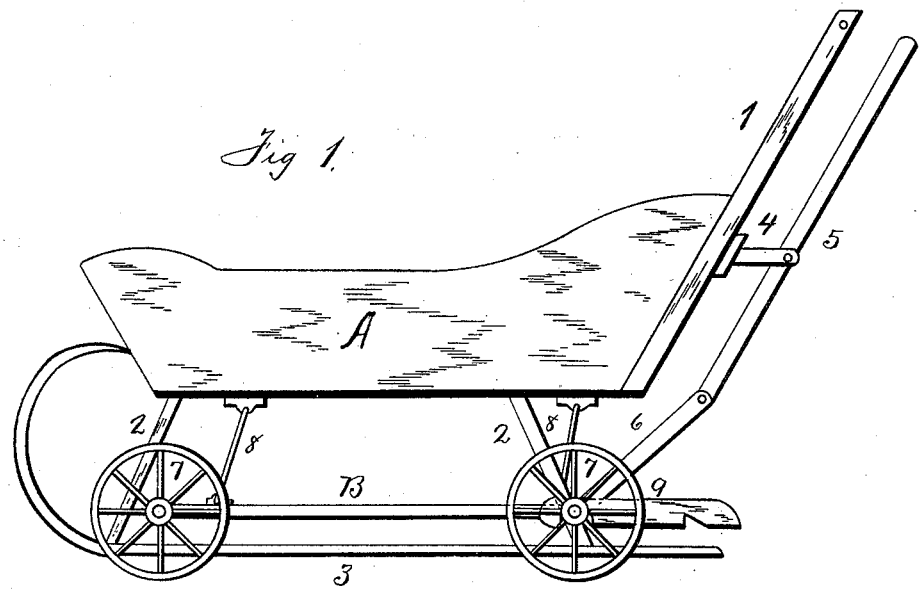
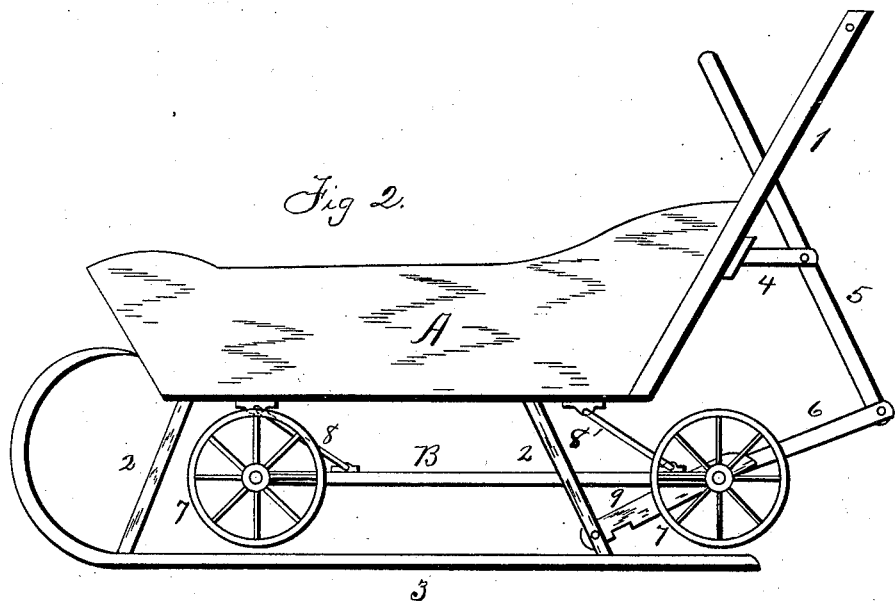
Witnesses
Silas J. Hogan.
F. T. Denison.
John S. Gourlay Inventor
By his Attorneys
Smith & Denison

UNITED STATES PATENT OFFICE.

JOHN S. GOURLAY, OF SYRACUSE, NEW YORK.

COMBINED CARRIAGE AND SLEIGH.

SPECIFICATION forming part of Letters Patent No. 432,268, dated July 15, 1890.

Application filed December 7, 1889. Serial No. 332,898. (No model.)

*To all whom it may concern:*

Be it known that I, JOHN S. GOURLAY, of Syracuse, in the county of Onondaga, in the State of New York, have invented new and useful Improvements in a Combined Carriage and Sleigh, of which the following, taken in connection with the accompanying drawings, is a full, clear, and exact description.

My invention relates to combined sleighs and carriages which can be converted at will from a sleigh to a carriage, or vice versa.

My object is to construct a combined sleigh and carriage in which the sleigh-body and the carriage-gear are connected by links, the gear being connected by a bar to a lever pivoted upon the sleigh-body, so that by throwing the top of the lever forward the carriage-gear and wheels will be drawn backward and upward, thereby bringing the sleigh-runners down onto the ground and raising the wheels up off from the ground and then locking the parts in that position, and then by unlocking the frame and pulling the lever back throwing the carriage-gear and wheels forward and downward onto the ground and raising the sleigh off from the ground.

My invention consists in the several novel features of construction and operation hereinafter fully described, and which are specifically set forth in the claim annexed. It is constructed as follows, reference being had to the accompanying drawings, in which—

Figure 1 is a side elevation of the device in use as a carriage. Fig. 2 is a like view of the same in use as a sleigh.

A is the body, of substantially the form shown, provided with a push-handle 1 upon its rear end, with knees 2 and runners 3. Upon the back end of the body I mount a stud 4, in which the lever 5 is pivotally mounted, the lower end of which is pivotally connected to the bar 6, which is secured pivotally upon the rear end of the carriage-frame 13. This frame consists of side and end bars, and the end bars may be the axles upon which the wheels 7 are mounted. It is connected by the links 8 to the bottom of the body, and 9 is a locking-hook pivoted upon a rear knee and notched to engage with the rear axle, as in Fig. 1, to hold up the sleigh, and in Fig. 2 to hold up the carriage-gear and wheels. It will be seen that when in use as a sleigh it can be easily and quickly converted into a carriage by unlocking the hook 9 and pulling back on the lever 5, which pushes the carriage-gear and wheels forward and downward until the wheels touch the ground, and then the continuance of the lever movement will raise the sleigh-runners clear from the ground. Then the reversal or pulling forward of the lever will swing the gear, frame, and wheels away from the ground, and the hook 9 will support them there.

What I claim as my invention, and desire to secure by Letters Patent, is—

The combination, with a sleigh, of a carriage gear and wheels, links pivotally connected to the gear and to the sleigh-body and supporting the gear, a lever pivotally connected to the sleigh-body and to a bar pivotally connected to the gear-frame, and means for locking the gear and sleigh together, as set forth.

In witness whereof I have hereunto set my hand this 5th day of December, 1889.

JOHN S. GOURLAY.

In presence of—
H. P. DENISON,
F. T. DENISON.